United States Patent
Fujiwara et al.

(10) Patent No.: US 10,077,815 B2
(45) Date of Patent: Sep. 18, 2018

(54) POWER GENERATION DEVICE AND ONE-WAY CLUTCH STRUCTURE

(71) Applicant: JTEKT CORPORATION, Osaka-shi, Osaka (JP)

(72) Inventors: Hideki Fujiwara, Kitakatsuragi-gun (JP); Takeshi Takaki, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 322 days.

(21) Appl. No.: 14/774,346

(22) PCT Filed: Mar. 4, 2014

(86) PCT No.: PCT/JP2014/055416
§ 371 (c)(1),
(2) Date: Sep. 10, 2015

(87) PCT Pub. No.: WO2014/141945
PCT Pub. Date: Sep. 18, 2014

(65) Prior Publication Data
US 2016/0040729 A1    Feb. 11, 2016

(30) Foreign Application Priority Data
Mar. 12, 2013   (JP) ................. 2013-048657

(51) Int. Cl.
*F16D 41/06*     (2006.01)
*H02K 7/108*    (2006.01)
(Continued)

(52) U.S. Cl.
CPC .............. *F16D 41/06* (2013.01); *F03D 9/25* (2016.05); *F03D 15/10* (2016.05); *F03D 80/70* (2016.05);
(Continued)

(58) Field of Classification Search
CPC . H02K 7/10; H02K 7/108; H02K 7/11; H02K 7/112; H02K 7/116; F16D 41/00;
(Continued)

(56) References Cited

U.S. PATENT DOCUMENTS 524,530 A * 8/1894 Porter .................. F16D 41/061
192/45.002
4,461,957 A * 7/1984 Jallen .................... F03D 7/0272
290/44
(Continued)

FOREIGN PATENT DOCUMENTS

CN     102770665 A    11/2012
DE   202010012597 U1   1/2011
(Continued)

OTHER PUBLICATIONS

Apr. 22, 2014 International Search Report issued in International Patent Application No. PCT/JP2014/055416.
(Continued)

*Primary Examiner* — Tran Nguyen
(74) *Attorney, Agent, or Firm* — Oliff PLC (57) ABSTRACT

A one-way clutch structure includes: a pair of clutch members disposed between an output shaft and a drive shaft so as to oppose each other in an axial direction; and an engagement element interposed between these clutch members. When a rotation speed of the output shaft exceeds a rotation speed of the drive shaft, the engagement element engages with the clutch portion to connect the output shaft and the drive shaft so as to be integrally rotatable. When the rotation speed of the output shaft becomes lower than the rotation speed of the drive shaft, the engagement of the engagement elements is released to cut off connection between the output shaft and the drive shaft.

10 Claims, 8 Drawing Sheets

(51) Int. Cl.
*H02K 7/112* (2006.01)
*F03D 15/10* (2016.01)
*F03D 80/70* (2016.01)
*H02K 7/116* (2006.01)
*F16D 41/00* (2006.01)
*F03D 9/25* (2016.01)
*F03D 15/00* (2016.01)
*F16D 41/061* (2006.01)

(52) U.S. Cl.
CPC .............. *F16D 41/00* (2013.01); *H02K 7/108* (2013.01); *H02K 7/112* (2013.01); *H02K 7/116* (2013.01); *F03D 15/00* (2016.05); *F05B 2260/403* (2013.01); *F05B 2260/4023* (2013.01); *F16D 41/061* (2013.01); *Y02E 10/72* (2013.01)

(58) Field of Classification Search
CPC .......... F16D 41/06; F16D 41/061; F03D 7/02; F03D 7/027; F03D 7/0272; F03D 7/043; F03D 9/25
See application file for complete search history.

(56) References Cited

U.S. PATENT DOCUMENTS

| | | | |
|---|---|---|---|
| 4,613,763 A | 9/1986 | Swansen | |
| 4,667,788 A * | 5/1987 | Johnston | F16D 41/061 192/45.016 |
| 4,989,704 A * | 2/1991 | Morishita | F16D 41/066 192/41 R |
| 5,483,849 A * | 1/1996 | Orii | A62B 35/0093 188/184 |
| 6,093,991 A * | 7/2000 | Tanaka | H02K 7/10 192/45.008 |
| 8,393,453 B2 * | 3/2013 | Shirataki | F16D 41/067 192/45.013 |
| 9,035,476 B2 * | 5/2015 | Fujiwara | F16D 7/10 290/1 C |
| 9,322,395 B2 * | 4/2016 | Fujiwara | F16D 7/10 |
| 2007/0267263 A1 * | 11/2007 | Pederson | F16D 41/066 192/45.018 |
| 2008/0236977 A1 * | 10/2008 | Akiyoshi | F16D 41/067 192/45.019 |
| 2010/0096234 A1 * | 4/2010 | Liang | F16D 41/066 192/45.018 |
| 2012/0020792 A1 * | 1/2012 | Frank | F03D 7/0204 416/169 R |
| 2012/0045335 A1 * | 2/2012 | Heidenreich | F03D 11/02 416/170 R |
| 2013/0043679 A1 | 2/2013 | Nomoto | |

FOREIGN PATENT DOCUMENTS

| | | |
|---|---|---|
| JP | 2003-269316 A | 9/2003 |
| JP | 2006-009575 A | 1/2006 |
| JP | 2006-097888 A | 4/2006 |
| JP | 2006-118645 A | 5/2006 |
| JP | 2007-232186 A | 9/2007 |
| JP | 2008-185131 A | 8/2008 |

OTHER PUBLICATIONS

Sep. 23, 2016 Search Report issued in European Patent Application No. 14763957.9.

Jan. 22, 2017 Office Action issued in Chinese Patent Application No. 201480014586.5.

\* cited by examiner

POWER GENERATION DEVICE AND ONE-WAY CLUTCH STRUCTURE

TECHNICAL FIELD

One aspect of the present invention relates to, for example, a power generation device that drives a power generator by increasing, by a speed-up gear, the speed of the rotation of the main shaft by an external force, and a one-way clutch structure used for this power generation device.

BACKGROUND ART

As a wind power generation device that performs power generation by rotating the main shaft by the blade receiving wind, a device having a speed-up gear is available. This speed-up gear increases the rotation speed of the main shaft so that the power generator is driven.

Figure 8:
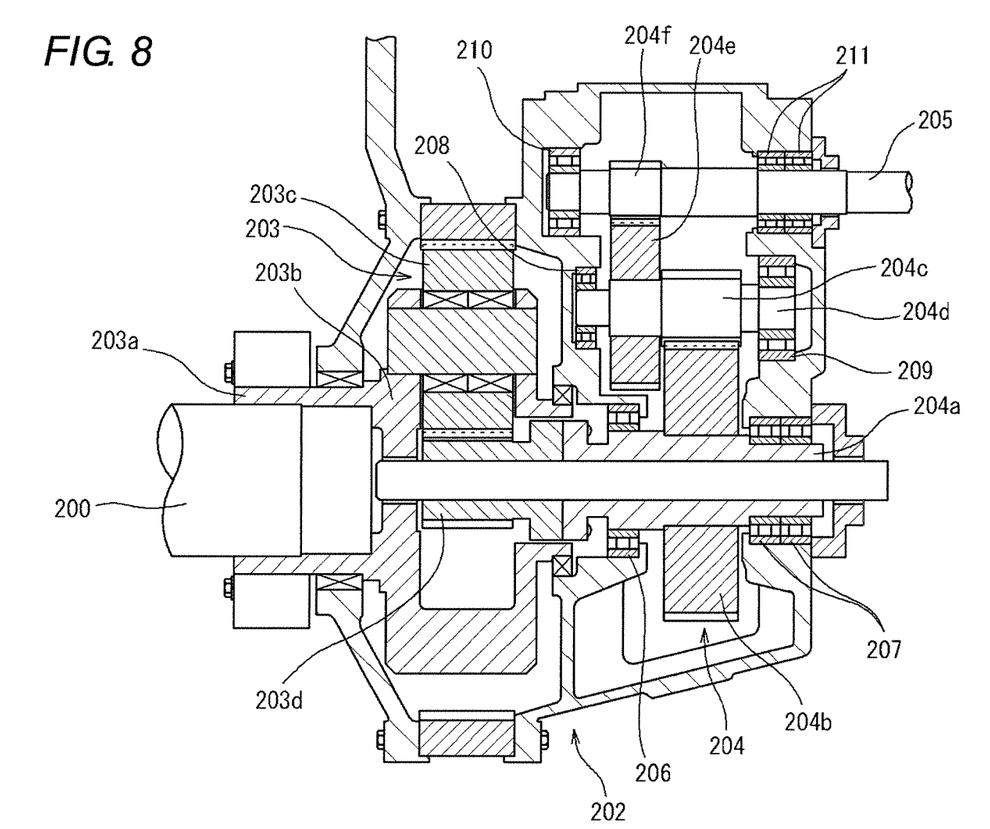
FIG. 8 is a cross-sectional view showing the speed-up gear of the background art.

As shown in FIG. 8, a speed-up gear 202 is provided with a planet gear mechanism 203 that receives the rotation of a main shaft 200 and increases its speed, a high-speed stepped gear mechanism 204 that receives the rotation increased in speed by this planet gear mechanism 203 and further increases the speed of the rotation, and an output shaft 205 that outputs the rotation increased in speed by this high-speed stepped gear mechanism 204. To this output shaft 205, the drive shaft (not shown) of the power generator is coupled, and to this drive shaft, the rotor of the generator is attached.

In the planet gear mechanism 203, when an input shaft 203a rotates that is integrally rotatably coupled to the main shaft 200 to which the non-illustrated blade is attached, a planet carrier 203b rotates, whereby a sun gear 203d is rotated with increased speed through a planet gear 203c. Then, this rotation is transmitted to a low-speed shaft 204a of the high-speed stepped gear mechanism 204.

In the high-speed stepped gear mechanism 204, when the low-speed shaft 204a rotates, an intermediate shaft 204d is rotated with increased speed through a low-speed gear 204b and a first intermediate gear 204c, and further, the output shaft 205 is rotated with increased speed through a second intermediate gear 204e and a high-speed gear 204f.

And in this speed-up gear 202, as the bearings that rotatably support the low-speed shaft 204a, the intermediate shaft 204d and the output shaft 205, rolling bearings (roller bearings) 206 to 211 are frequently used (for example, see Patent Document 1).

RELATED ART DOCUMENTS

Patent Documents

Patent Document 1: JP-A-2007-232186

SUMMARY OF THE INVENTION

Problem to be Solved by the Invention

The above-described wind power generation device has a problem in that at the rolling bearings (roller bearings) 210 and 211 that support the output shaft 205 rotating at high speed, smearing (a phenomenon in which surface seizure occurs) occurs on the rolling surface of the rolling element (roller) and the raceway surface of the rotating ring and this reduces the lives of the rolling bearings 210 and 211.

Such smearing is considered to occur similarly at rolling bearings (roller bearings) provided in power generation devices of different types that increase the rotation speed of the main shaft by a speed-up gear to drive the power generator as well as in the wind power generation device.

Accordingly, an object of one aspect of the present invention is to provide a power generation device capable of suppressing the occurrence of smearing at the rolling bearings that support the output shaft of the speed-up gear.

Means for Solving the Problem

The inventors of the present application performed earnest researches over and over again on the mechanism of occurrence of smearing. As a result, the following was found: When the rotation speed of the main shaft drastically decreases because of reduction in the external force (wind force), the rotation speed of the drive shaft of the power generator rotating integrally with the rotor seeks to exceed the rotation speed of the output shaft of the speed-up gear because of the inertia of the rotor of the power generator having a large weight, whereby a so-called leak of torque (leak of load) occurs on the output shaft; by this leak of torque, the radial load acting on the rolling bearing supporting the output shaft is decreased, and at this rolling bearing, the sliding frictional resistance or the like between the rolling element and the cage holding it exceeds the rolling frictional resistance between the rolling element and the rotating ring, whereby the rotation of the rolling element is delayed. And the inventors obtained the following findings and completed the present invention based on such findings: If the rotation speed of the main shaft drastically increases from this condition by an increase in the external force (wind force), the inertia torque of the rotor due to the speed increase is added to the output shaft, so that the radial load acting on the rolling bearings supporting this output shaft drastically increases. For this reason, at that moment (transient condition), a slide occurs between the rolling element and the rotating ring under a condition where a high load is acting on the rolling element and the temperature of the surface of contact between the rolling element and the rotating ring increases to thereby cause smearing.

That is, one aspect of the present invention provides a one-way clutch structure disposed between an output shaft contained in a speed-up gear which increases a rotation speed of a main shaft rotated by an external force and supported by a rolling bearing, and a drive shaft of a power generator, the one-way clutch structure including: a first clutch portion which rotates integrally with the output shaft and a second clutch portion which rotates integrally with the drive shaft, the first and second clutch portions being disposed between the output shaft and the drive shaft so as to oppose each other in an axial direction; and an engagement element interposed between the pair of clutch portions, wherein when the main shaft rotates in a normal direction and a rotation speed of the output shaft exceeds a rotation speed of the drive shaft, the engagement element engages with the pair of clutch portions to connect the output shaft and the drive shaft so as to be integrally rotatable, and when the rotation speed of the output shaft becomes lower than the rotation speed of the drive shaft, the engagement of the engagement element is released to cut off connection between the output shaft and the drive shaft.

According to the above-described aspect, when the rotation speed of the output shaft of the speed-up gear exceeds the rotation speed of the drive shaft of the power generator, the output shaft and the drive shaft are connected in such a manner that they are integrally rotatable, and power is transmitted from the output shaft to the drive shaft. Thereby, the drive shaft is rotated to perform power generation.

On the contrary, when the rotation speed of the output shaft becomes lower than the rotation speed of the drive shaft, the connection (power transmission) between the output shaft and the drive shaft is cut off. Therefore, even if the rotation speed of the main shaft drastically decreases because of reduction in the external force and the rotation speed of the output shaft drastically decreases accordingly, the rotation by the inertia of the rotor of the power generator can be prevented from being transmitted to the output shaft through the drive shaft. Thereby, reduction in the radial load acting on the rolling bearing supporting the output shaft and delay in the rotation of the rolling element accompanying this can be suppressed. Therefore, even if the rotation speed of the main shaft drastically increases from this condition because of a change in the external force and a heavy load acts on the rolling element of the rolling bearing, the rolling element does not readily slide on the surface of contact with the rotating ring, so that the generation of smearing on the rolling bearing can be suppressed.

Moreover, the following is preferable: a plurality of wedge-shaped space portions are formed along a circumferential direction between the pair of clutch portions, such that the wedge-shaped space portions have axial dimensions gradually increasing from one side in the circumferential direction toward the other side and such that the engagement element is disposed in each of the wedge-shaped space portions one by one, and the engagement elements move in the circumferential direction toward a narrow side of the wedge-shaped space portions thereby engaging with the pair of clutch portions to connect the output shaft and the drive shaft so as to be integrally rotatable, and the engagement elements move in the circumferential direction toward a wide side of the wedge-shaped space portions thereby releasing the engagement of the engagement elements to cut off the connection between the output shaft and the drive shaft.

Thereby, a structure can be obtained where when the rotation speed of the output shaft exceeds the rotation speed of the drive shaft, the engagement elements are moved toward the narrow side of the wedge-shaped space portions in the circumferential direction to connect the output shaft and the drive shaft in such a manner that they are integrally rotatable, and a structure can be obtained where when the rotation speed of the output shaft becomes lower than the rotation speed of the drive shaft, the engagement elements are moved toward the wide side of the wedge-shaped space portions in the circumferential direction to cut off the connection between the output shaft and the drive shaft.

Moreover, while the shaft end portions (parts) of the output shaft and the drive shaft may be structured as the first clutch portion and the second clutch portion, respectively, it is preferable that the one-way clutch structure further includes: a first fixing member which attaches and fixes the first clutch portion to the output shaft; and a second fixing member which attaches and fixes the second clutch portion to the drive shaft.

In this case, the first clutch portion and the second clutch portion are separate from the output shaft and the drive shaft, so that assembly of the one-way clutch structure is facilitated.

Moreover, it is preferable that the one-way clutch structure further includes an adjustment member which adjusts at least one of an axial distance between the output shaft and the first clutch portion and an axial distance between the drive shaft and the second clutch portion, and in this case, the axial distance between the first clutch portion and the second clutch portion can be adjusted.

Moreover, another aspect of the present invention provides a power generation device including: a main shaft rotated by an external force; a speed-up gear including a rotation transmission mechanism which increases a rotation speed of the main shaft, an output shaft which outputs the rotation increased in speed by the rotation transmission mechanism, and a rolling bearing which rotatably supports the output shaft; a power generator which includes a drive shaft rotating with rotation of the output shaft as an input and a rotor rotating integrally with the drive shaft, and which generates power as the rotor rotates; and a one-way clutch including a first clutch portion rotating integrally with the output shaft and a second clutch portion rotating integrally with the drive shaft, the first and second clutch portions being disposed between the output shaft and the drive shaft so as to oppose each other in an axial direction, and an engagement element interposed between the pair of clutch portions, wherein when the main shaft rotates in a normal direction and a rotation speed of the output shaft exceeds a rotation speed of the drive shaft, the engagement element engages with the pair of clutch portions to connect the output shaft and the drive shaft so as to be integrally rotatable, and when the rotation speed of the output shaft becomes lower than the rotation speed of the drive shaft, the engagement of the engagement element is released to cut off connection between the output shaft and the drive shaft.

According to the above-described aspect, when the rotation speed of the output shaft of the speed-up gear exceeds the rotation speed of the drive shaft of the power generator by the one-way clutch, the output shaft and the drive shaft are connected in such a manner that they are integrally rotatable, and power is transmitted from the output shaft to the drive shaft. Thereby, the drive shaft is rotated to perform power generation.

On the contrary, when the rotation speed of the output shaft becomes lower than the rotation speed of the drive shaft, the connection (power transmission) between the output shaft and the drive shaft is cut off. Therefore, even if the rotation speed of the main shaft drastically decreases because of reduction in the external force and the rotation speed of the output shaft drastically decreases accordingly, the rotation by the inertia of the rotor of the power generator can be prevented from being transmitted to the output shaft through the drive shaft. Thereby, reduction in the radial load acting on the rolling bearing supporting the output shaft and delay in the rotation of the rolling element accompanying this can be suppressed. Therefore, even if the rotation speed of the main shaft drastically increases from this condition because of a change in the external force and a heavy load acts on the rolling element of the rolling bearing, the rolling element does not readily slide on the surface of contact with the rotating ring, so that the generation of smearing on the rolling bearing can be suppressed.

Moreover, it is preferable that the power generator includes a brake which brakes the drive shaft, and the one-way clutch is provided between the brake and the speed-up gear, and in this case, the drive shaft can be braked by the brake.

Advantages of the Invention

According to the one-way clutch structure and the power generation device of the aspects of the present invention, the generation of smearing on the rolling bearing supporting the output shaft of the speed-up gear can be suppressed.

MODE FOR CARRYING OUT THE INVENTION

Figure 1:
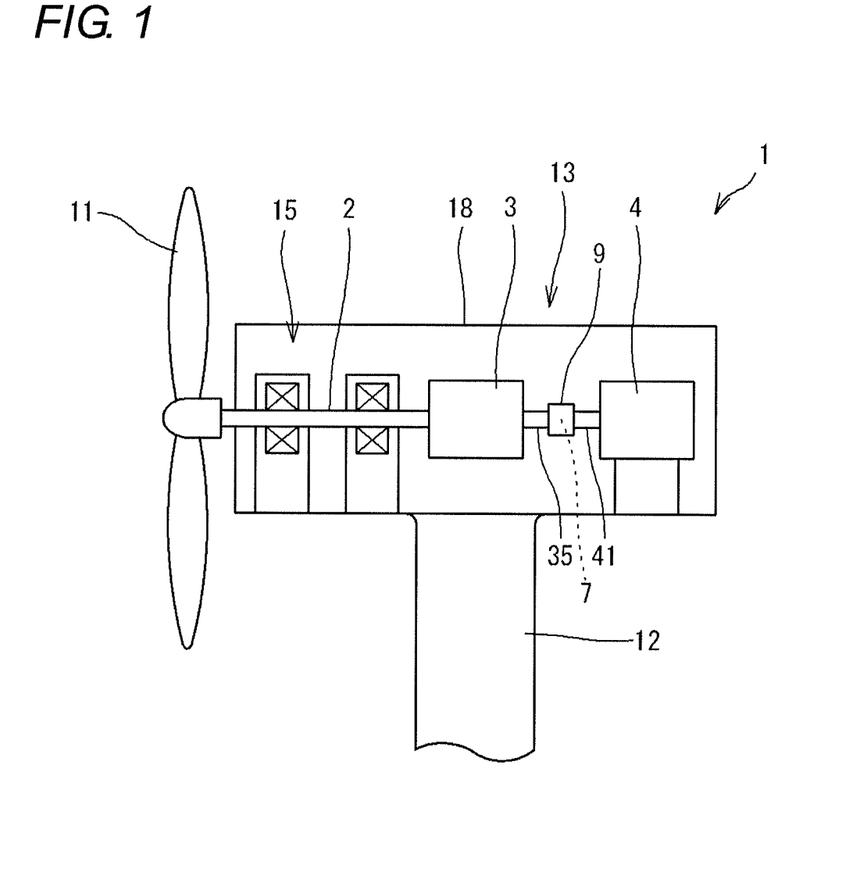
FIG. 1 is a schematic side view showing an embodiment of the power generation device of the present invention.

FIG. 1 is a schematic side view showing an embodiment of the power generation device of the present invention. The power generation device of the present embodiment is a wind power generation device having a main shaft 2 that rotates by the wind force (external force). This wind power generation device 1 is provided with a blade (wind receiving member) 11, a strut 12 and a nacelle 13. The blade 11 is formed of a plurality of blades provided at an end of the main shaft 2, and rotates the main shaft 2 by receiving wind. The nacelle 13 is provided with the main shaft 2, a support mechanism 15 for supporting this main shaft 2, a speed-up gear 3 that increases the rotation speed of the main shaft 2, a power generator 4 that generates power by the rotation power increased in speed by the speed-up gear 3, a casing 18 accommodating these, and the like. The strut 12 supports the nacelle 13 in such a manner that it can rotate horizontally about the shaft center in the vertical direction.

Figure 2:
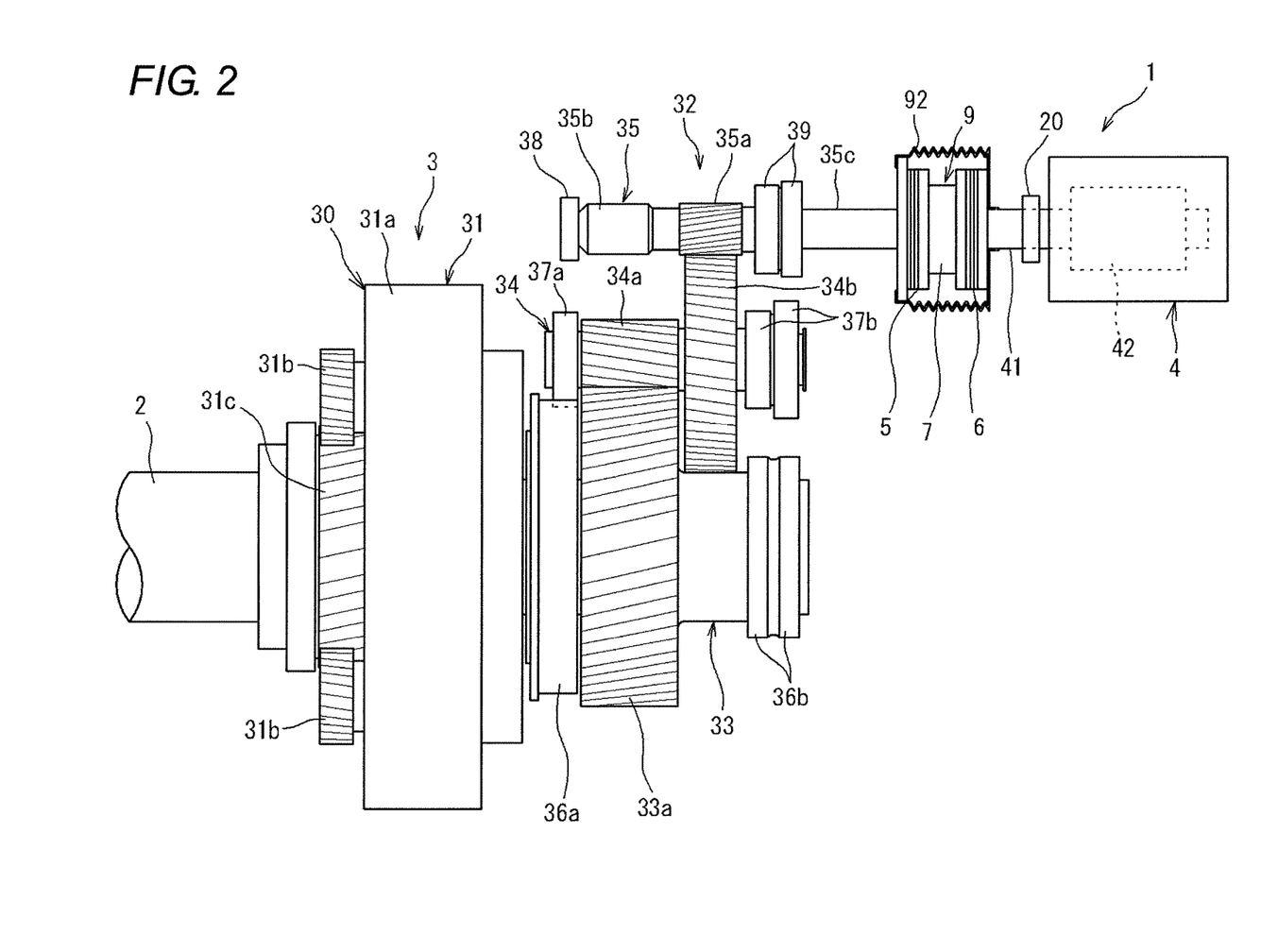
FIG. 2 is a schematic structural view showing a speed-up gear and a power generator.

FIG. 2 is a schematic side view showing the speed-up gear 3 and the power generator 4.

The power generator 4 is formed of, for example, an induction power generator, and has a drive shaft 41 that rotates by receiving the rotation increased in speed by the speed-up gear 3, a rotor 42 incorporated in the power generator 4, a non-illustrated stator, and the like. The rotor 42 is coupled to the drive shaft 41 in such a manner that it is rotatable integrally therewith, and the power generator 4 generates power as the drive shaft 41 rotates to drive the rotor 42. Moreover, the power generator 4 has a brake 20 that brakes the drive shaft 41. The brake 20 is capable of restraining the rotation of the drive shaft 41.

The speed-up gear 3 is provided with a gear mechanism (rotation transmission mechanism) 30 that receives the rotation of the main shaft 2 and increases its speed. The gear mechanism 30 is provided with a planet gear mechanism 31 and a high-speed stepped gear mechanism 32 that receives the rotation increased in speed by the planet gear mechanism 31 and further increases the speed of the rotation.

The planet gear mechanism 31 has an internal gear (ring gear) 31a, a plurality of planet gears 31b held by a planet carrier (not shown) coupled to the main shaft 2 in such a manner that it is rotatable integrally therewith, and a sun gear 31c meshing with the planet gears 31b. Thereby, when the planet carrier rotates together with the main shaft 2, the sun gear 31c rotates through the planet gears 31b, and the rotation is transmitted to a low-speed shaft 33 of the high-speed stepped gear mechanism 32.

The high-speed stepped gear mechanism 32 is provided with the low-speed shaft 33 having a low-speed gear 33a, an intermediate shaft 34 having a first intermediate gear 34a and a second intermediate gear 34b, and an output shaft 35 having a high-speed gear 35a.

The low-speed shaft 33 is formed of a large-size rotation shaft the diameter of which is, for example, approximately 1 m, and is disposed concentrically with the main shaft 2. Both end portions of the low-speed shaft 33 in the axial direction are rotatably supported by rolling bearings (roller bearings) 36a and 36b.

The intermediate shaft 34 is disposed in the neighborhood of the low-speed shaft 33, and both end portions thereof in the axial direction are rotatably supported by rolling bearings (roller bearings) 37a and 37b. The first intermediate gear 34a of the intermediate shaft 34 meshes with the low-speed gear 33a, and the second intermediate gear 34b meshes with the high-speed gear 35a.

The output shaft 35 is disposed in the neighborhood of the intermediate shaft 34, and outputs a running torque. The output shaft 35 is rotatably supported by rolling bearings (38, 39) on the side of one end portion 35b in the axial direction thereof and the side of the other end portion (output end portion) 35c, respectively.

By the above-described structure, the rotation speed of the main shaft 2 is increased in three steps by the gear ratio of the planet gear mechanism 31, the gear ratio between the low-speed gear 33a and the first intermediate gear 34a and the gear ratio between the second intermediate gear 34b and the high-speed gear 35a, and a running torque is outputted from the output end portion 35c of the output shaft 35. That is, the rotation of the main shaft 2 by the wind force can drive the power generator 4 while being increased in speed in three steps by the speed-up gear 3.

Figure 7:
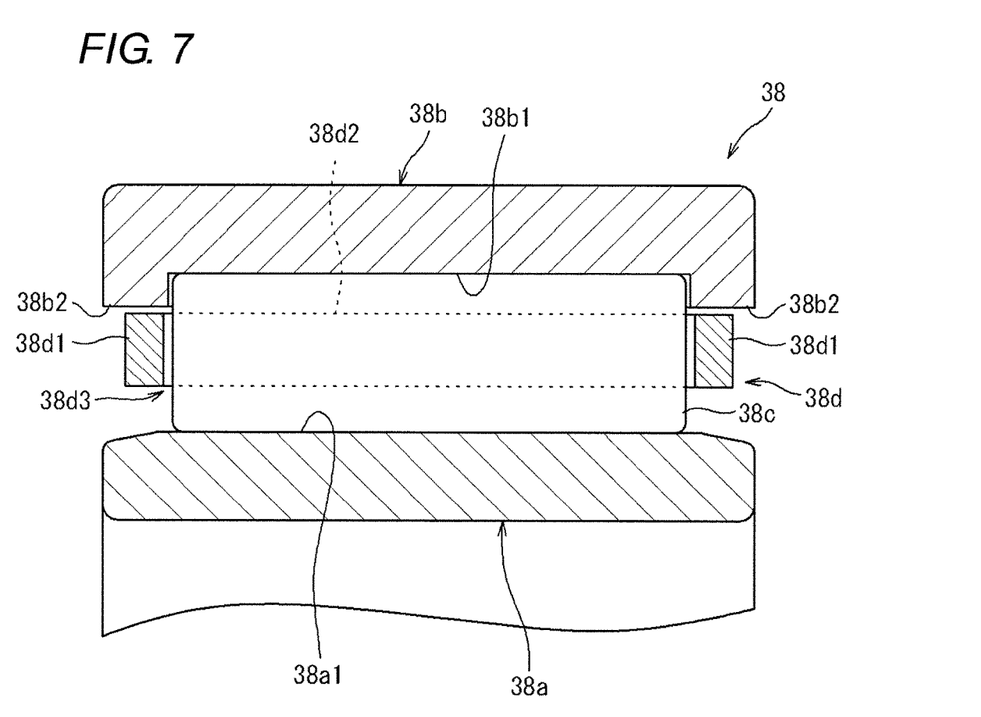
FIG. 7 is a cross-sectional view showing a rolling bearing contained in the speed-up gear.

FIG. 7 is a cross-sectional view showing the rolling bearing contained in the speed-up gear 3. In the present embodiment, the rolling bearing that rotatably supports the output shaft 35 is the roller bearing 38. The roller bearing 38 is particularly formed of a cylindrical roller bearing, and is provided with an inner ring 38a externally fitted and fixed onto the output shaft 35, an outer ring 38b fixed to a housing (not shown), a plurality of cylindrical rollers 38c disposed between the inner ring 38a and the outer ring 38b in such a manner that it is rollable, and an annular cage 38d holding the cylindrical rollers 38c at predetermined intervals in the circumferential direction. The inner ring 38a, the outer ring 38b and the cylindrical rollers 38c are made of, for example, bearing steel, and the annular cage 38d is made of, for example, a copper alloy.

The inner ring 38a has an inner ring raceway surface 38a1 formed in a central part of its outer periphery in the axial direction. The outer ring 38b is disposed concentrically with the inner ring 38a, and has an outer ring raceway surface 38b1 formed in a central part of its inner periphery in the axial direction and a pair of outer ring rib portions 38b2 formed on both side of this outer ring raceway surface 38b1 in the axial direction. The outer ring raceway surface 38b1 is disposed in such a manner that it faces the inner ring raceway surface 38a1. The outer ring rib portions 38b2 are so formed as to protrude from both end portions of the inner periphery of the outer ring 38b in the axial direction toward the inside in the radial direction, and the end surfaces of the cylindrical rollers 38c are in sliding contact with this outer ring rib portions 38b2.

The cylindrical rollers 38c are rollably disposed between the inner ring raceway surface 38a1 of the inner ring 38a and the outer ring raceway surface 38b1 of the outer ring 38b.

The cage 38d has a pair of annular portions 38d1 disposed in such a manner that they are separated in the axial direction and a plurality of strut portions 38d2 spaced uniformly in the circumferential direction of the annular portions 38d1 and coupling the annular portions 38d1 together. Between the pair of annular portions 38d1 and the adjoining strut portions 38d2, pockets 38d3 are formed, respectively, and in the pockets 38d3, the cylindrical rollers 38c are disposed, respectively.

In FIG. 2, the wind power generation device 1 is provided with a shaft coupling device (coupling device) 9 that connects the output shaft 35 of the speed-up gear 3 and the drive shaft 41 of the power generator 4 in such a manner that they are integrally rotatable. This shaft coupling device 9 is provided with an input rotating body 5, an output rotating body 6 and a one-way clutch 7, and is structured also as a clutch unit. The one-way clutch 7 is provided between the brake 20 of the wind power generation device 1 and the speed-up gear 3.

Figure 3:
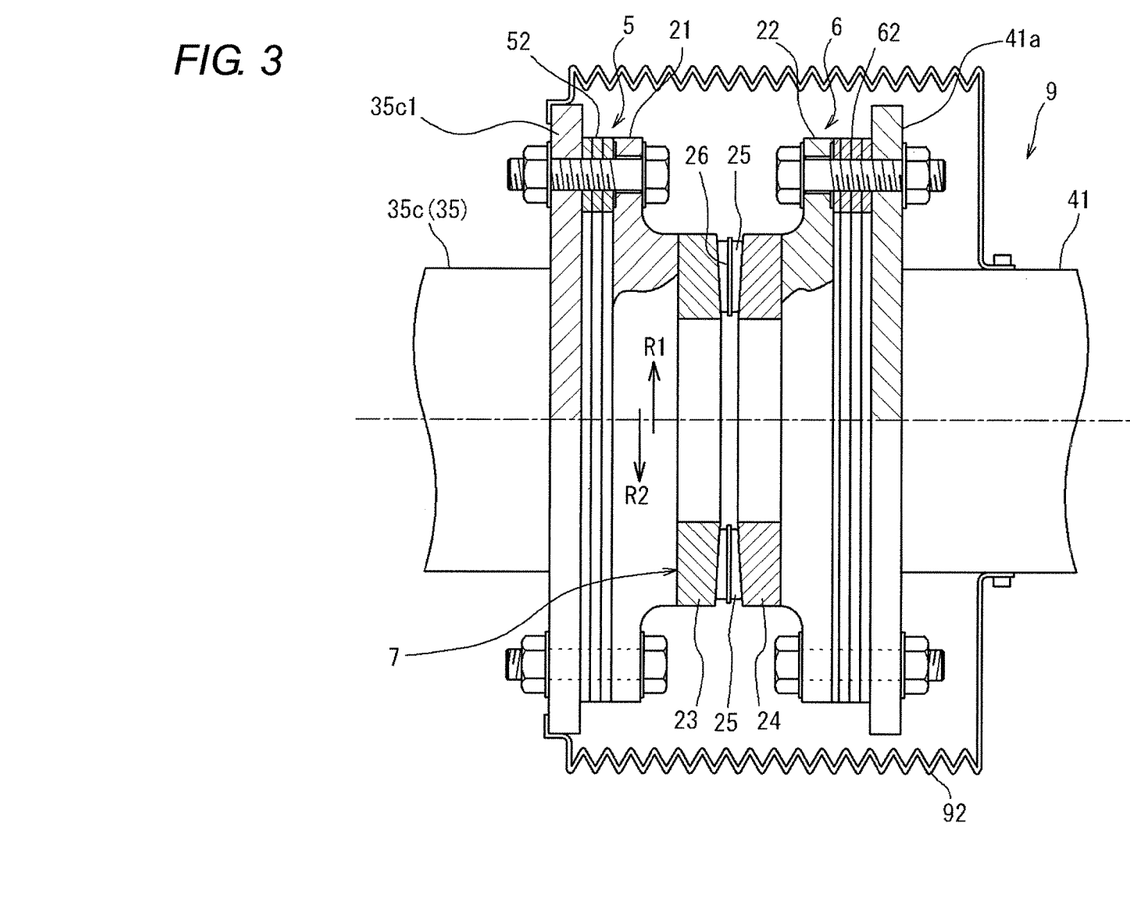
FIG. 3 is a side view showing the part of coupling between an output shaft of the speed-up gear and a drive shaft of the power generator.

FIG. 3 is a side view (partially cross-sectional view) showing the shaft coupling device 9. To the drive shaft 41, a cover member 92 that covers the shaft coupling device 9 is attached.

To the output end portion 35c of the output shaft 35, a flange portion 35c1 is integrally fixed. To an input end portion of the drive shaft 41, a flange portion 41a is integrally fixed. To the flange portion 35c1, a first fixing member 21 is attached by a bolt, and to the flange portion 41a, a second fixing member 22 is attached by a bolt. The first fixing member 21 and the second fixing member 22 are each formed of a plate-form flange member fixed by the flange portion 35c1, the flange portion 41a and a bolt.

Between the first fixing member 21 and the second fixing member 22, the one-way clutch 7 having a first clutch member 23 and a second clutch member 24 is provided. The first fixing member 21 and the first clutch member 23 are coupled and fixed by a non-illustrated bolt (for example, a hexagon socket head cap bolt). The second fixing member 22 and the second clutch member 24 are coupled and fixed by a non-illustrated bolt (for example, a hexagon socket head cap bolt).

In the present embodiment, an adjustment member 52 is interposed between the flange portion 35c1 and the first fixing member 21, and an adjustment member 62 is interposed between the flange portion 41a and the second fixing member 22.

The adjustment members 52 and 62 are each formed of a plate member. One or more than one adjustment member 52 is provided between the flange portion 35c1 and the first fixing member 21 in a state of being laminated in the axial direction. Moreover, one or more than one adjustment member 62 is provided between the flange portion 41a and the second fixing member 22 in a state of being laminated in the axial direction. By changing the number of adjustment members 52 (62), the axial position of the first fixing member 21 (the second fixing member 22) with respect to the flange portion 35c1 (the flange portion 41a) is adjusted, whereby the axial position of the first clutch member 23 (the second clutch member 24) with respect to the flange portion 35c1 (the flange portion 41a) can be adjusted. Consequently, the axial distance between the first clutch member 23 and the second clutch member 24 (that is, the axial dimension of a later-described wedge-shaped space portion S) is adjusted.

In the present embodiment, the input rotating body 5 includes the flange portion 35c1, the first fixing member 21 and the adjustment member 52, and the output rotating body 6 includes the flange portion 41a, the second fixing member 22 and the adjustment member 62. The one-way clutch 7 is disposed between the input rotating body 5 and the output rotating body 6.

The one-way clutch 7 is provided in order to make it possible to connect and disconnect the rotation of the output shaft 35 to and from the drive shaft 41 through the input rotating body 5 and the output rotating body 6. For this purpose, the one-way clutch 7 has the first clutch member 23, the second clutch member 24 and a plurality of tapered rollers (engagement elements) 25. The first clutch member 23 and the second clutch member 24 are disposed in such a manner that they face each other in the axial direction, and the tapered rollers 25 are interposed between the pair of clutch members 23 and 24 facing in the axial direction.

Figure 4:
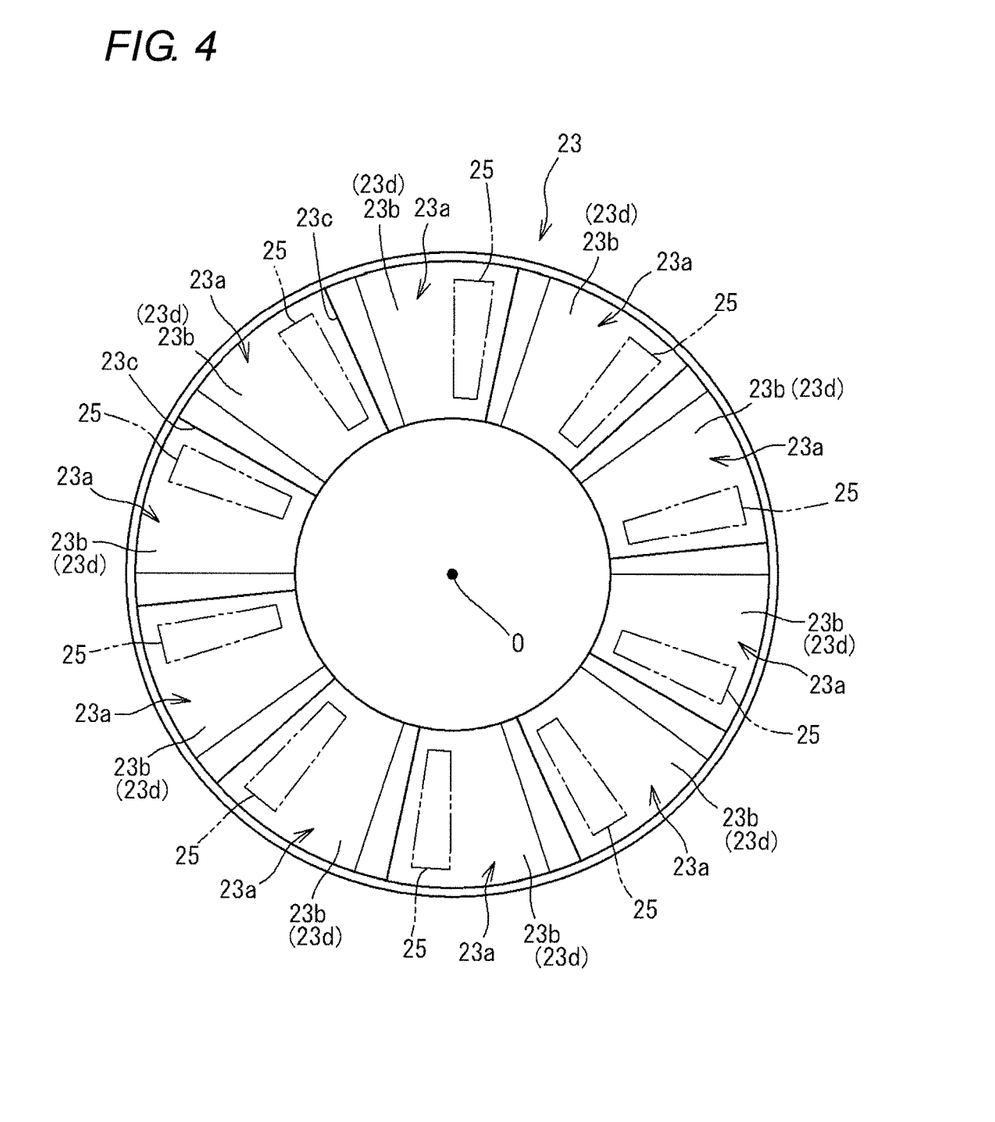
FIG. 4 is a view of a clutch member (clutch portion) viewed from the axial direction.
Figure 5:
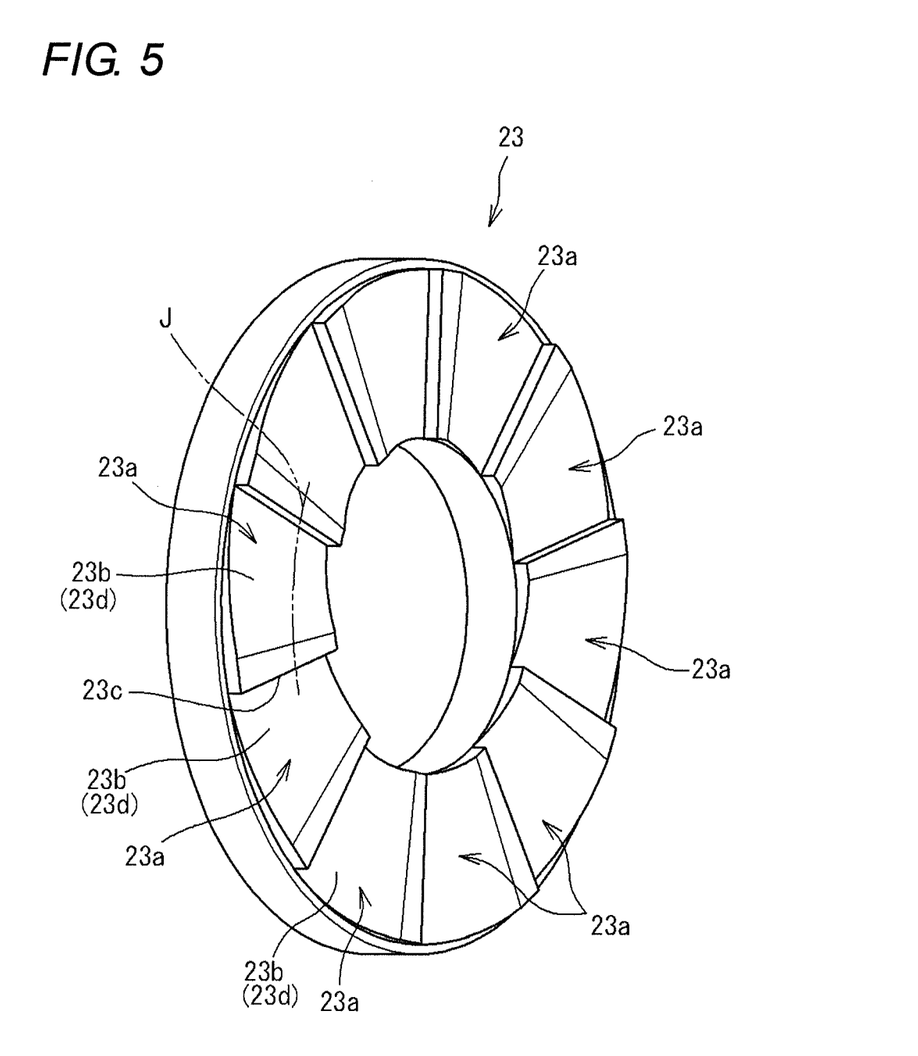
FIG. 5 is a perspective view of the clutch member (clutch portion).
Figure 6:
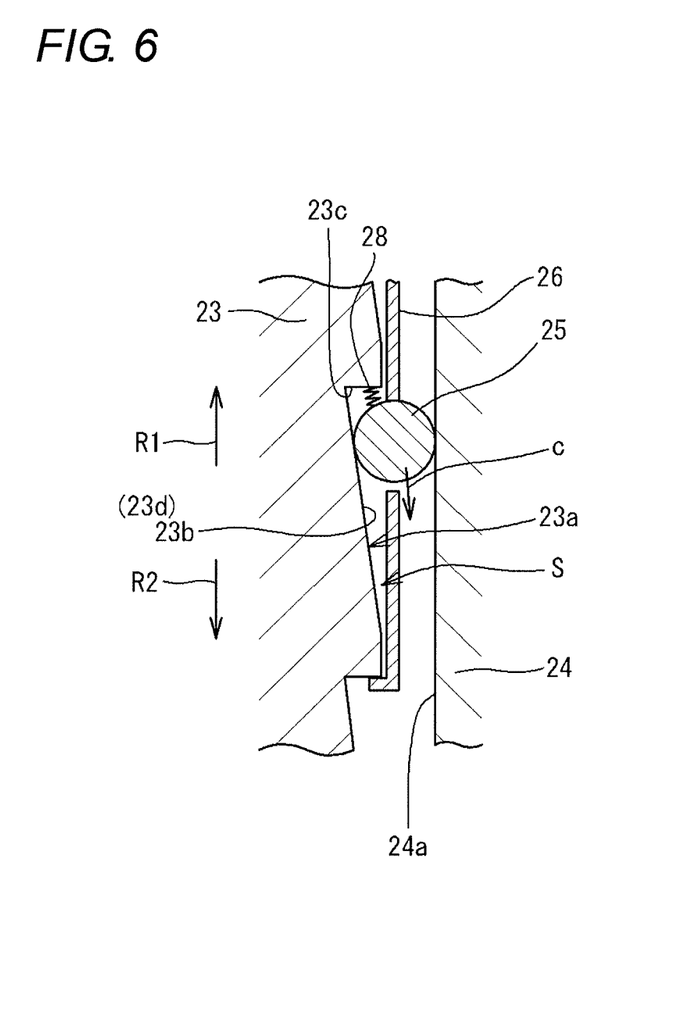
FIG. 6 is a cross-sectional view showing a part of a one-way clutch.

FIG. 4 is a view of the first clutch member 23 viewed from the axial direction (the side of the second clutch member 24). In FIG. 4, the tapered rollers 25 are shown by alternate long and two short dashes lines. FIG. 5 is a perspective view of the first clutch member 23. FIG. 6 is a cross-sectional view showing a part of the one-way clutch 7, and as the first clutch member 23 in FIG. 6, the cross section of the part along the alternate long and two short dashes line J of FIG. 5 is shown.

The first clutch member 23 is formed of an annular disk member, and is fixed to the flange portion 35c1 on the side of the output shaft 35 by the first fixing member 21 (see FIG. 3) to be rotatable integrally with the output shaft 35.

On the side surface of the first clutch member 23 facing the second clutch member 24, a plurality of concave portions 23a are formed at intervals in the circumferential direction. The bottom surface 23b of each concave portion 23a is formed of a slanting surface slanting so that one side in the circumferential direction is deep (deep in the axial direction) and the other side is shallow (shallow in the axial direction). This slanting surface forms a cam surface 23d described later. On one end portions of the concave portions 23a in the circumferential direction, step portions 23c where the heights in the axial direction are different are formed. The side surface on the opposite side of the first clutch member 23 is a flat surface without any asperities, and abuts on the side surface of the first fixing member 21 (see FIG. 3) in the axial direction.

As shown in FIG. 3, the second clutch member 24 is formed of an annular disk member, and is fixed to the flange portion 41a on the side of the drive shaft 41 by the second fixing member 22 to be rotatable integrally with the drive shaft 41. The second clutch member 24 is disposed in such a manner that it faces the first clutch member 23 in the axial direction. The side surface 24a, in the axial direction, of the second clutch member 24 facing the first clutch member 23 (see FIG. 6) is formed to be a flat surface without any asperities. The surface on the opposite side of the side surface 24a is a flat surface without any asperities, and abuts on the side surface of the second fixing member 22 in the axial direction.

By the concave portions 23a formed on the first clutch member 23, a plurality of wedge-shaped space portions S (see FIG. 6) are formed in the circumferential direction between the bottom surfaces 23b of the concave portions 23a and the side surface 24a of the second clutch member 24 facing the bottom surfaces 23b. Since the bottom surfaces 23b of the concave portions 23a are slanting surfaces, in each wedge-shaped space portion S, the axial distance between the slanting surface (the bottom surface 23b) of the concave portion 23a and the side surface 24a of the second clutch member 24 gradually increases from one side in the circumferential direction (lower side in FIG. 6) toward the other side in the circumferential direction (upper side in FIG. 6). That is, the axial dimension of each wedge-shaped space portion S gradually increases from one side in the circumferential direction (lower side in FIG. 6) toward the other side in the circumferential direction (upper side in FIG. 6). Moreover, in order to provide the tapered rollers 25 in the wedge-shaped space portions S, the distance between the slanting surface (the bottom surface 23b) of the concave portion 23a and the side surface 24a increases toward the outside in the radial direction and decreases toward the inside in the radial direction.

The tapered roller 25 is formed of a roller in the form of a truncated cone, and the center line thereof is oriented in the radial direction of the first and second clutch members 23 and 24. The tapered roller 25 is sandwiched between the first clutch member 23 and the second clutch member 24, and becomes rollable in the circumferential direction by their relative rotations.

In particular, the extension lines of the generatrices of the bottom surfaces 23b and the side surface 24a, and the tapered rollers 25 in contact (line contact) therewith intersect on the rotation shaft center O (see FIG. 4) of the first and second clutch members 23 and 24. For this reason, a slide of the tapered rollers 25 does not readily occur on the bottom surfaces 23b of the first clutch member 23 and the side surface 24a of the second clutch member 24.

The tapered rollers 25 are disposed one in each wedge-shaped space portion S (in each concave portion 23a of the first clutch member 23), and the first clutch member 23 and the second clutch member 24 abut on the first fixing member 21 and the second fixing member 22 and are fixed to the flange portion 35c1 and the flange portion 41a, respectively, under a condition where they can push against each other in the axial direction with a plurality of tapered rollers 25 therebetween.

Moreover, in FIG. 6, each tapered roller 25 is pushed toward the narrow side of the wedge-shaped space portion S (lower side in FIG. 6) by an elastic member 28 provided in each concave portion 23a. While the elastic member 28 of the present embodiment is formed of a compression coil spring, it may be a different form of spring such as a leaf spring.

Regarding the tapered rollers 25, the distances therebetween in the circumferential direction and the radial positions and inclinations thereof are held by an annular cage 26.

According to the wind power generation device 1 provided with the one-way clutch 7 having the above-described structure, when the wind force that the blade 11 (see FIG. 1) receives increases to increase the rotation speed of the main shaft 2 that rotates in the normal direction, this increases the rotation speed of the output shaft 35 rotating with speed increased by the speed-up gear 3. Thereby, in FIG. 3, the input rotating body 5 rotating integrally with the output shaft 35 and the first clutch member 23 are increased in speed, and these integrally rotate at high speed.

Then, at the one-way clutch 7, when the rotation speed of the output shaft 35 increases so that the rotation speed of the output shaft 35 exceeds the rotation speed of the drive shaft 41, the first clutch member 23 rotating integrally with the output shaft 35 acts to rotate relatively to the second clutch member 24 in one direction (the direction of the arrow R1 in FIG. 3). In this case, as shown in FIG. 6, the tapered roller 25 slightly moves by the pushing force of the elastic member 28 in a direction in which the wedge-shaped space portion S becomes narrower in the circumferential direction (the direction of the arrow c), the outer periphery of the tapered roller 25 is pressed against the cam surface 23d of the first clutch member 23 (the bottom surface 23b of the concave portion 23a) and the side surface 24a of the second clutch member 24, and the tapered roller 25 is brought into a condition of engaging between the first clutch member 23 and the second clutch member 24.

Thereby, the first and second clutch members 23 and 24 become integrally rotatable in the one direction (the direction of the arrow R1 in FIG. 3), and the output shaft 35 and the drive shaft 41 are brought into a condition of being connected in such a manner that they rotate integrally with each other. Thereby, a torque is provided from the output shaft 35 to the drive shaft 41, and the rotor 42 (see FIG. 1) rotates together with the drive shaft 41 at the power generator 4 to perform power generation.

Moreover, when the output shaft 35 comes to rotate at a constant speed after rotating with increased speed and the rotation speed of the output shaft 35 becomes the same as the rotation speed of the drive shaft 41, the tapered roller 25 is held in a condition of engaging between the first and second clutch members 23 and 24. For this reason, the one-way clutch 7 maintains the integral rotation of the first and second clutch members 23 and 24 in the one direction, and the output shaft 35 and the drive shaft 41 continue rotating integrally to perform power generation.

On the other hand, for example, when the wind force that the non-illustrated blade receives is weakened to decrease the rotation speed of the main shaft 2 (see FIG. 2) rotating in the normal direction and this decreases the rotation speed of the output shaft 35 rotating with speed increased by the speed-up gear 3, the rotation speed of the first clutch member 23 also decreases. On the contrary, the rotation speeds of the drive shaft 41 and the second clutch member 24 are not significantly decreased by the inertial force of the rotor 42.

When the rotation speed of the output shaft 35 decreases as described above and the rotation speed of the output shaft 35 is lower than the rotation speed of the drive shaft 41, at the one-way clutch 7, the first clutch member 23 acts to rotate relatively (rotates relatively) to the second clutch member 24 in the other direction (the direction of the arrow R2 in FIG. 3). In this case, the tapered rollers 25 slightly move circumferentially in a direction in which the width of the wedge-shaped space portion S increases (the direction opposite to the arrow c of FIG. 6) against the pushing force of the elastic member 28, whereby the engagement among the tapered rollers 25 and the first and second clutch members 23 and 24 is released. By the engagement of the tapered rollers 25 being thus released, the connection between the output shaft 35 and the drive shaft 41 is cut off.

Even if the connection is thus cut off, at the power generator 4, the rotor 42 continues rotating because of the inertial force and power generation is performed.

As described above, between the speed-up gear 3 and the power generator 4 of the wind power generation device 1 (see FIG. 3), the one-way clutch 7 is placed that has a pair of clutch members 23 and 24 disposed between the output shaft 35 of the speed-up gear 3 and the drive shaft 41 of the power generator 4 in such a manner that they face each other in the axial direction and a plurality of tapered rollers 25 interposed between these clutch members 23 and 24. According to this one-way clutch 7, when the rotation speed of the output shaft 35 becomes lower than the rotation speed of the drive shaft 41, as described above, the engagement of the tapered rollers 25 with the pair of clutch members 23 and 24 is released, so that the connection (power transmission) between the output shaft 35 and the drive shaft 41 can be cut off. That is, even if the rotation speed of the output shaft 35 of the speed-up gear 3 drastically decreases through the main shaft 2 because of reduction in the wind force, the rotation by the inertia of the rotor 42 of the power generator 4 can be prevented from being transmitted to the output shaft 35 through the drive shaft 41.

Thereby, reduction in the radial load acting on the rolling bearing 38 (FIG. 7) supporting the output shaft 35 and delay in the rotation of the cylindrical rollers 38c accompanying this, that is, a slide between the cylindrical rollers 38c, and the inner ring 38a and the outer ring 38b can be suppressed. Therefore, even if the rotation speed of the main shaft 2 drastically increases from this condition because of a change in the wind force and a heavy load acts on the cylindrical rollers 38c, the cylindrical rollers 38c do not readily slide on the surface of contact with the inner ring 38a, so that the generation of smearing on the rolling bearing 38 can be effectively suppressed.

Moreover, by preventing the rotation of the rotor 42 by inertia from being transmitted to the output shaft 35, the load acting on the roller bearings 36a, 36b, 37a, 37b, 38 and 39 of the speed-up gear 3 (see FIG. 2) and the like can be reduced. For this reason, the gears 31b and 31c of the planet gear mechanism 31 and the shafts 33 to 35 and the roller bearings 36a, 36b, 37a, 37b, 38 and 39 of the high-speed stepped gear mechanism 32 can all be reduced in size, so that the speed-up gear 3 can be reduced in weight and can be manufactured at low cost.

Further, by the one-way clutch 7 cutting off the connection between the output shaft 35 and the drive shaft 41 under a predetermined condition, the rotor 42 of the power generator 4 continues rotating by inertia without drastically decreasing in speed, so that the average rotation speed of the rotor 42 can be increased. Thereby, the power generation efficiency of the power generator 4 can be improved.

Moreover, in the present embodiment (see FIG. 3), the one-way clutch structure is structured so that the one-way clutch 7 includes the first fixing member 21 and the second fixing member 22. The first fixing member 21 is a member for attaching the first clutch member 23 to the output shaft 35 (the flange portion 35c1 fixed to the output shaft 35) and fixing it. Since this first fixing member 21 is fixed to the flange portion 35c1 by a bolt, the first clutch member 23 together with the first fixing member 21 can be detached from the output shaft 35 by removing this bolt. That is, the first fixing member 21 attaches the first clutch member 23 to the output shaft 35 in such a manner that it is rotatable integrally with and attachable and detachable to and from the output shaft 35.

Likewise, the second fixing member 22 is a member for attaching the second clutch member 24 to the drive shaft 41 (the flange portion 41a fixed to the drive shaft 41) and fixing it. Since this second fixing member 22 is fixed to the flange portion 41a by a bolt, the second clutch member 24 together with the second fixing member 22 can be detached from the drive shaft 41 by detaching this bolt. That is, the second fixing member 22 attaches the second clutch member 24 to the drive shaft 41 in such a manner that it is rotatable integrally with and attachable and detachable to and from the drive shaft 41.

As described above, by the first clutch member 23 and the second clutch member 24 being members separate from the output shaft 35 and the drive shaft 41, assembly of the one-way clutch 7 is facilitated.

Further, in the present embodiment, the axial distance between the output shaft 35 (the flange portion 35c1) and the first clutch member 23 can be adjusted by the adjustment member 52 and the axial distance between the drive shaft 41 (the flange portion 41a) and the second clutch member 24 can be adjusted by the adjustment member 62. As a result, the axial distance between the first clutch member 23 and the second clutch member 24 (the axial dimension of the wedge-shaped space portion S) can be adjusted, and the axial contact force on the tapered rollers 25 by the clutch members 23 and 24 can be adjusted.

While a case where both the adjustment member 52 on the side of the output shaft 35 and the adjustment member 62 on the side of the drive shaft 41 are provided, the provided adjustment member may be only either one of them.

Moreover, the power generation device and the like of the present invention are not limited to the illustrated embodiment but may be ones of a different embodiment within the scope of the present invention. While the rolling bearings supporting the output shaft 35 are roller bearings (see FIG. 7) in the above-described embodiment, they may be a different type of rolling bearings; for example, they may be ball bearings.

The present application is based upon Japanese Patent Application (No. 2013-048657) filed on Mar. 12, 2013, the contents of which are incorporated herein by reference.

DESCRIPTION OF REFERENCE SIGNS

1: Wind power generation device (power generation device)
2: Main shaft
3: Speed-up gear
4: Power generator
7: One-way clutch
20: Brake
21: First fixing member
22: Second fixing member
23: First clutch member (first clutch portion)
24: Second clutch member (second clutch portion)
25: Tapered roller (engagement element)
30: Gear mechanism (rotation transmission mechanism)
35: Output shaft
38: Roller bearing (rolling bearing)
39: Roller bearing (rolling bearing)
41: Drive shaft
42: Rotor
52: Adjustment member
62: Adjustment member
S: Wedge-shaped space portion

The invention claimed is:

1. A one-way clutch structure disposed between an output shaft contained in a speed-up gear which increases a rotation speed of a main shaft rotated by an external force and supported by a rolling bearing, and a drive shaft of a power generator, the one-way clutch structure comprising:

a first clutch portion which rotates integrally with the output shaft, and a second clutch portion which rotates integrally with the drive shaft, the first and second clutch portions being disposed between the output shaft and the drive shaft so as to oppose each other in an axial direction;

a plurality of wedge-shaped space portions formed along a circumferential direction between the first and second clutch portions, such that the plurality of wedge-shaped space portions have axial dimensions gradually increasing from one side in the circumferential direction toward an other side, and each of the plurality of wedge-shaped space portions terminate at a step portion;

at least one engagement element disposed in each of the plurality of wedge-shaped space portions; and at least one elastic member interposed between the at least one engagement element and the step portion of an adjacent wedge-shaped portion, the at least one elastic member biasing the at least one engagement element in the axial direction and between the first clutch portion and the second clutch portion, wherein:

when the main shaft rotates in a normal direction and a rotation speed of the output shaft exceeds a rotation speed of the drive shaft, the at least one engagement element engages with the first and second clutch portions in the axial direction to connect the output shaft and the drive shaft so as to be integrally rotatable, and when the rotation speed of the output shaft becomes lower than the rotation speed of the drive shaft, the engagement of the at least one engagement element is released to cut off connection between the output shaft and the drive shaft.

2. The one-way clutch structure according to claim 1, wherein the at least one engagement element moves in the circumferential direction toward a narrow side of the plurality of wedge-shaped space portions thereby engaging with the first and second clutch portions to connect the output shaft and the drive shaft so as to be integrally rotatable, and the at least one engagement element moves in the circumferential direction toward a wide side of the plurality of wedge-shaped space portions thereby releasing the engagement of the engagement element to cut off the connection between the output shaft and the drive shaft.

3. The one-way clutch structure according to claim 1, further comprising:
a first fixing member which attaches and fixes the first clutch portion to the output shaft; and
a second fixing member which attaches and fixes the second clutch portion to the drive shaft.

4. The one-way clutch structure according to claim 1, further comprising:
an adjustment member which adjusts at least one of an axial distance between the output shaft and the first clutch portion, and an axial distance between the drive shaft and the second clutch portion.

5. A power generation device comprising:
a main shaft rotated by an external force;
a speed-up gear including: (i) a rotation transmission mechanism which increases a rotation speed of the main shaft, (ii) an output shaft which outputs the rotation increased in speed by the rotation transmission mechanism, and (iii) a rolling bearing which rotatably supports the output shaft;
a power generator including a drive shaft rotating with rotation of the output shaft as an input and a rotor rotating integrally with the drive shaft, the power generator generating power as the rotor rotates; and
a one-way clutch including:
a first clutch portion rotating integrally with the output shaft and a second clutch portion rotating integrally with the drive shaft, the first and second clutch portions being disposed between the output shaft and the drive shaft so as to oppose each other in an axial direction;

a plurality of wedge-shaped space portions formed along a circumferential direction between the first and second clutch portions, such that the plurality of wedge-shaped space portions have axial dimensions gradually increasing from one side in the circumferential direction toward an other side, and each of the plurality of wedge-shaped space portions terminate at a step portion;

at least one engagement element disposed in each of the plurality of wedge-shaped space portions; and at least one elastic member interposed between the at least one engagement element and the step portion of an adjacent wedge-shaped portion, the at least one elastic member biasing the at least one engagement element in the axial direction and between the first clutch portion and the second clutch portion, wherein:

when the main shaft rotates in a normal direction and a rotation speed of the output shaft exceeds a rotation speed of the drive shaft, the at least one engagement element engages with the first and second clutch portions in the axial direction to connect the output shaft and the drive shaft so as to be integrally rotatable, and when the rotation speed of the output shaft becomes lower than the rotation speed of the drive shaft, the engagement of the at least one engagement element is released to cut off connection between the output shaft and the drive shaft.

6. The power generation device according to claim 5, wherein:
the power generator includes a brake which brakes the drive shaft, and
the one-way clutch is provided between the brake and the speed-up gear.

7. The one-way clutch structure according to claim 2, further comprising:
a first fixing member which attaches and fixes the first clutch portion to the output shaft; and
a second fixing member which attaches and fixes the second clutch portion to the drive shaft.

8. The one-way clutch structure according to claim 2, further comprising:
an adjustment member which adjusts at least one of an axial distance between the output shaft and the first clutch portion, and an axial distance between the drive shaft and the second clutch portion.

9. The one-way clutch structure according to claim 3, further comprising:
an adjustment member which adjusts at least one of an axial distance between the output shaft and the first clutch portion, and an axial distance between the drive shaft and the second clutch portion.

10. The one-way clutch structure according to claim 7, further comprising:
an adjustment member which adjusts at least one of an axial distance between the output shaft and the first clutch portion, and an axial distance between the drive shaft and the second clutch portion.

* * * * *